United States Patent [19]

Morgan et al.

[11] 3,973,272
[45] Aug. 3, 1976

[54] DISC RECEIVER INTERLOCK FOR DISC RECORDERS

[75] Inventors: Samuel A. Morgan; Samuel N. Irwin; Otto R. Butsch, all of Ann Arbor, Mich.

[73] Assignee: Sycor, Inc., Ann Arbor, Mich.

[22] Filed: Oct. 29, 1974

[21] Appl. No.: 518,501

[52] U.S. Cl. .................................. 360/86; 360/99; 360/104; 360/103; 360/105
[51] Int. Cl.² .................... G11B 5/012; G11B 5/55; G11B 21/10
[58] Field of Search ................ 360/69, 97, 98, 133, 360/105, 99, 109, 86, 75, 77, 78; 346/137

[56] References Cited
UNITED STATES PATENTS

| | | | |
|---|---|---|---|
| 3,487,390 | 12/1969 | Klinger et al. | 360/98 |
| 3,529,301 | 9/1970 | Hiruta | 360/97 |
| 3,593,327 | 7/1971 | Shill | 360/97 |
| 3,643,240 | 2/1972 | Raiser | 360/98 |
| 3,797,033 | 3/1974 | Prieur | 360/98 |

*Primary Examiner*—Alfred H. Eddleman
*Attorney, Agent, or Firm*—Price, Heneveld, Huizenga & Cooper

[57] ABSTRACT

A data recorder/reproducer device for flexible magnetic disc media, having a door-like structure mounted on a supportive frame. The door structure receives a recording disc and is adapted to carry a recording head at one or both sides of the disc. The heads are articulated for selective control of movement toward or away from the disc, into or out of transducing relation and also for translational movement across the face of the disc, generally radially thereof. The device includes novel interlocking actuator means which prevent opening of the door or doors except when the heads, positioned by a translational drive means, are in a predetermined "home" or start position at the edge of the disc, thereby preventing the inadvertent erasure or other loss or destruction of the recorded information.

12 Claims, 11 Drawing Figures

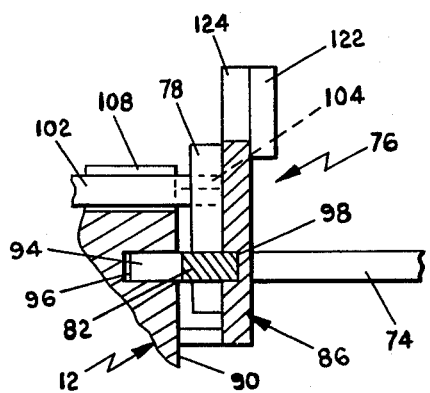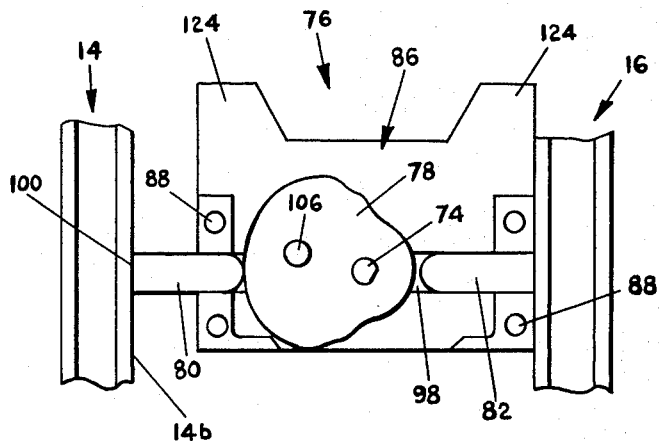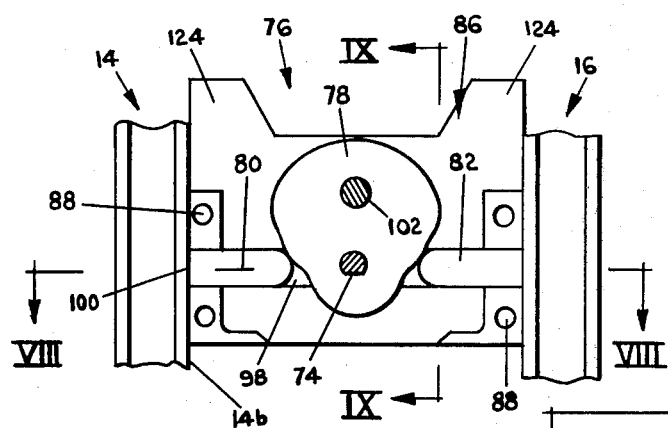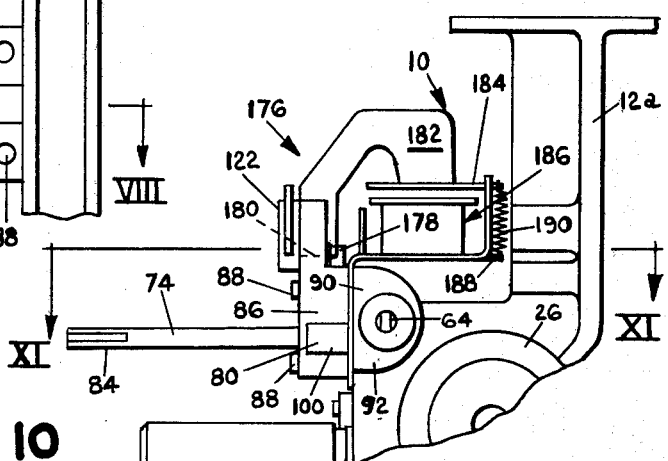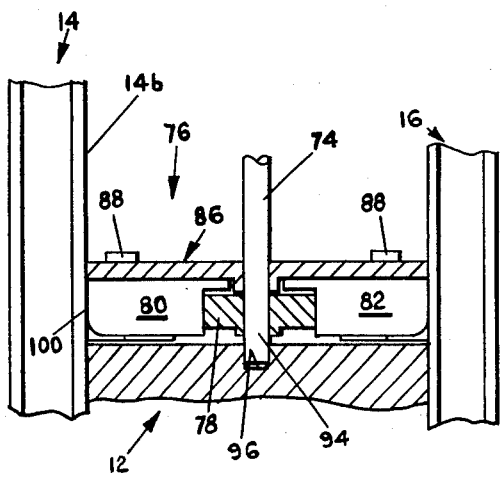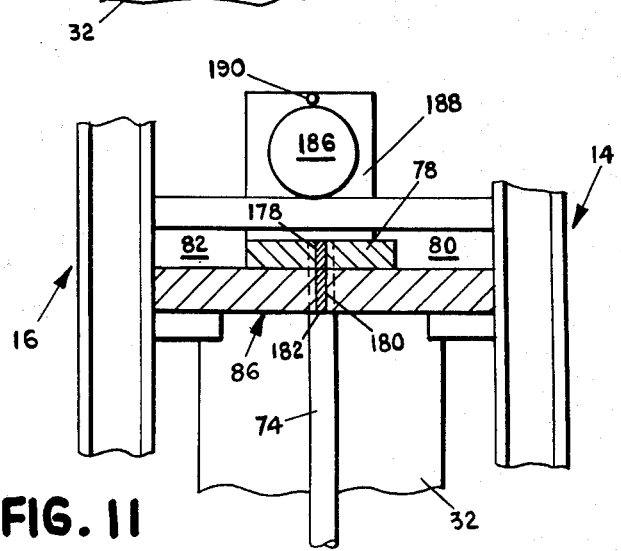

DISC RECEIVER INTERLOCK FOR DISC RECORDERS

BACKGROUND OF THE INVENTION

Long-term data storage has long been accomplished on such media as magnetic tape and rigid magnetic discs, as well as punched paper cards and tape. More recently, the advent of flexible disc recording technologies have shown the advantages of the inexpensive limp or "floppy" flexible discs, typically made by coating the opposite sides of a thin highly flexible sheet of polymeric or other plastic film with magnetic oxide, with the coated disc being only on the order of 3 to 4 mils thick. This limply flexible disc is permanently enclosed within a close-fitting sleeve-like protective outer envelope, in which it may be rotated while the envelope is held in position. The envelope has an enlarged central opening for access to the center of the disc, and also has a radial slot opening, by which a magnetic head may access the face of the disc while the same is rotated. For example, the disc structure may be substantially as shown in U.S. Pat. No. 3,668,658 entitled MAGNETIC RECORD DISC COVER issued June 6, 1972 to Ralph Flores, et al., and one form of recorder/reproducer device for such a device is shown in U.S. Pat. No. 3,678,481 entitled DATA STORAGE APPARATUS EMPLOYING A SINGLE MAGNETIC DISC issued July 18, 1972 to Warren L. Daiziel, et al.

An improved recorder/reproducer apparatus for flexible disc recording, having greatly increased operational flexibility, greatly increased recording capacity, and considerably different structural characteristics from recorders used heretofore is shown in commonly assigned copending application Ser. No. 418,299 filed Nov. 23, 1973 entitled FLEXIBLE DISC RECORDER CONSTRUCTION and Ser. No. 510,471 filed Sept. 30, 1974 entitled METHOD AND APPARATUS FOR MOUNTING & POSITIONING MAGNETIC RECORDING HEADS.

The apparatus disclosed in the above-mentioned commonly assigned copending applications has a pair of pivotally mounted door-like structures adapted to receive the flexible disc elements, and to record on either or both sides of either or both such discs, as may be required. The apparatus includes at least two magnetic heads, and means mounting the same for articulated movement toward and away from their respective recording discs, as well as means mounting the heads for translational movement across the face of the discs while the same are rotated. A common drive means is provided by which both recording discs may be rotatably driven, as well as a common translational drive for the magnetic heads.

SUMMARY OF THE INVENTION

The present invention provides a disc-receiver interlock for insuring that the disc receiving door-like structures cannot be opened unless the recording head or heads are in a home or start position at the edge of the disc. The possibility of destruction or loss of the data contained on the disc for any of several reasons associated with inadvertent opening of the door and removal of the disc is thereby eliminated. The interlocking mechanism of the invention includes cam and actuator means for opening the disc-receiver and locking means operable by or through action of the translational drive means to lock the actuator in position except when the translational drive means (and the heads movable therewith) is in a predetermined position. In a preferred embodiment of the invention, the locking means is normally biased into a locking position with respect to the cam actuator. Means on the locking means and the translational drive means cooperatively operate to shift the locking means to a non-locking position when the heads are in a home or start position, thereby allowing opening of the disc receiver doors and access to the disc only when the head is in such home position.

The foregoing major attributes of the invention, together with the advantages thereof, as well as other important attributes and advantages, will become more apparent following consideration of the ensuing specification and the accompanying drawings illustrating a preferred embodiment thereof.

BRIEF DESCRIPTION OF THE DRAWINGS

FIG. 6 is an enlarged, fragmentary sectional elevation taken through the plane VI—VI of FIG. 2, showing cam and actuator means for opening the disc-receiver;

FIG. 7 is a fragmentary cross sectional view similar to FIG. 6 showing the disc-receivers in closed position with the cam and cam actuator means in a locked position;

FIG. 8 is a fragmentary cross sectional view taken along the plane VIII—VIII of FIG. 7;

FIG. 9 is a fragmentary cross sectional view taken along the plane IX—IX of FIG. 7;

FIG. 10 is a fragmentary side elevational view similar to FIG. 3 but showing a second embodiment of the interlock means in accordance herewith; and FIG. 11 is a fragmentary sectional plan view taken along the plane XI—XI of FIG. 10.

DESCRIPTION OF A PREFERRED EMBODIMENT

Figure 2:
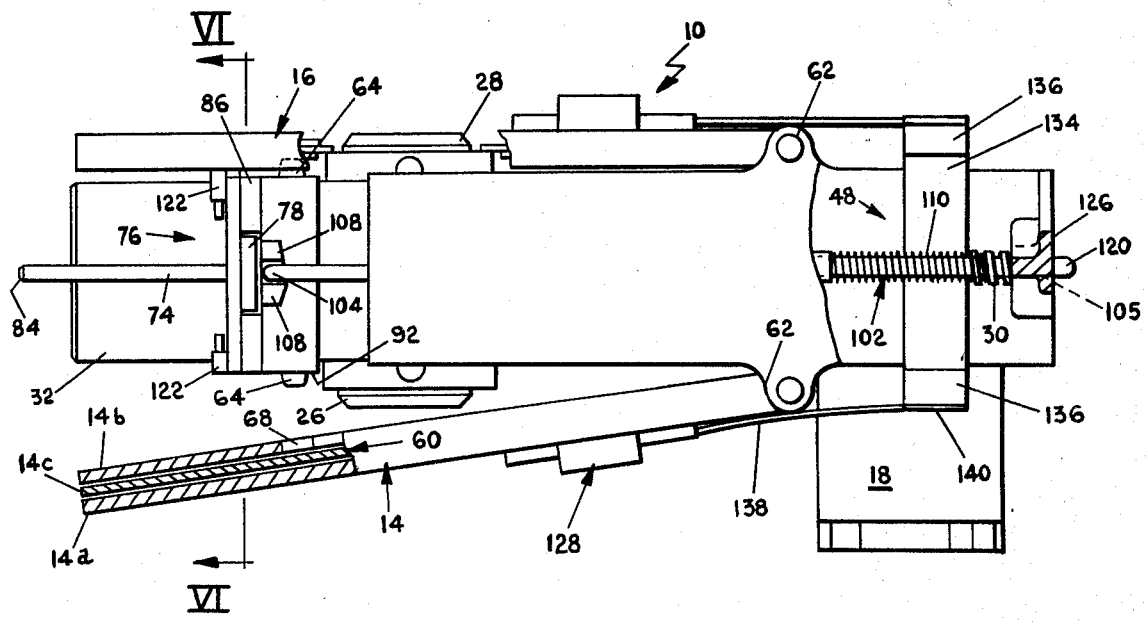
FIG. 2 is an overhead plan view of the apparatus of FIG. 1, showing one disc-receiver open for receiving a disc, the open position thereof being exaggerated for clarity.
Figure 3:
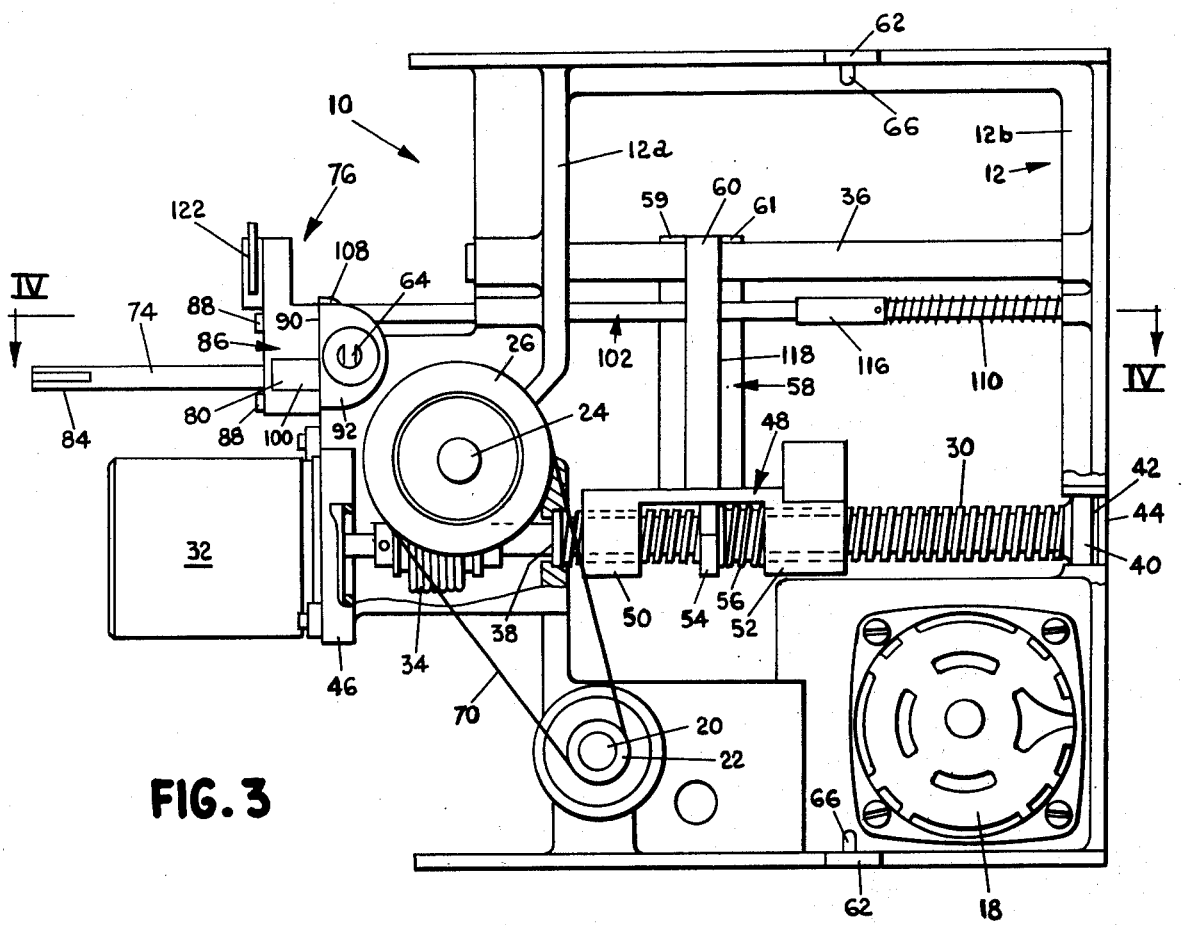
FIG. 3 is a side elevational view of the apparatus similar to FIG. 1 with the disc-receivers removed to show the supporting framework.

The recorder/reproducer apparatus 10 in which the novel interlocking means is incorporated includes an upright central frame 12 which carries a pair of disc-receivers 14 and 16 which are pivotally hinged on either side of the frame, similar to doors (FIG. 2). The frame 12 defines what may be referred to as the central plane area of the recorder device, i.e., the generally planar central area sandwiched between the disc-receivers 14 and 16, which are generally parallel when in their closed positions. Also, the frame 12 mounts many of the operative components of the device, including a drive motor 18, a jack shaft 20 having hubs or pulleys 22 on either side of the frame, a drive shaft 24 having drive hubs 26, 28 at either end thereof, and an elongated lead screw or worm 30, together with a stepper motor 32 which drives lead screw 30, through a coupling 34 which will compensate for alignment tolerances. Also, the frame 12 mounts a straight, smooth guide rod 36 above and parallel to lead screw 30. The lead screw or worm 30 is securely supported at each end, being mounted in bosses machined in upright supporting portions 12a, 12b located in either side of the frame and in which bearings 38, 40 are seated (FIG. 3). Bearing 40 seats against an internal shoulder inside its boss, and the worm is sprin-loaded toward upright frame portion 12a (i.e., toward the left as seen in FIG. 3) by a wave-type spring thrust washer 42 disposed between the end portion of the worm and bearing 40, the latter being held firmly in position by a split retaining ring 44. Stepper motor 32 mounts upon a machined pad 46 formed as an integral part of frame 12, with the coupling 34 thus floating between the rigidly mounted motor and worm. Stepper motor 32 may be a conventionally-available motor, for example, a fifteen-degree incremental stepper.

A traveling motion translator or follower device 48 is threaded on worm 30 to be moved thereby, upon rotation of the worm by the stepper motor 32. The translator or follower 48 has a pair of spaced bosses 50, 52 through which the worm threads pass. Boss 50 serves as a guide while boss 52 is threaded to engage several turns of the worm thread. An internally threaded collar 54 threaded on worm 30 cooperates with boss 52 and a bias spring 56 to form an anti-backlash assembly, and for other purposes not a part of this particular specification. Follower 48 has an upstanding central guide portion 58 with mutually-spaced finger-like projections 59, 60, 61 extending upwardly at the top, which slidably engage opposite sides of guide rod 36, to prevent rotation of the follower with the worm and thereby cause longitudinal translation of the follower when the worm is rotated.

The disc-receivers 14, 16 each comprise, in effect, a pair of generally rigid plate-like sides 14a, 14b, 16a, 16b (FIG. 4), fixedly secured together to define a narrow, slot-like space 14c (FIGS. 2 and 4) therebetween for receiving a flexible disc assembly 60 or other such recording media.

The disc-receivers 14 and 16 are each pivotally mounted upon frame 12 in a manner providing very accurate referencing of the receivers with respect to other portions of the device, e.g., the drive hubs 26 and 28. Frame 12 has a pair of pivot pin bosses 62 (FIGS. 2 and 3) on each side at the top and bottom thereof for pivotal mounting of the disc-receivers, and has a laterally-projecting alignment post 64 on each side located as close as practical to the axis of drive shaft 24. The lower pivot pin boss 62 has an accurately-located upper surface which provides a pivot support for the lower corner of the disc-receivers. Pivor pins 66 (FIG. 3) extend from each of the bosses 62 for engaging an aperture in a corresponding disc-receiver boss (not shown) whereby the disc-receivers may be opened in door-like fashion.

The alignment posts 64 are accurately positioned relative to the lower bosses 62 and pivot pins 66 to engage, and locate, appropriate apertures 68 (FIG. 2) in the inner side (such as 14b) on each of the disc-receivers, to thus provide a centering or aligning function. A disc assembly 60 within the receivers will be accurately positioned relative to the drive hubs 26, 28 as the disc-receiver is closed.

The drive motor 18 has a drive hub or pulley on its shaft, which a flexible drive belt (not shown) couples to a hub opposite hub 22 on jack shaft 20. Hub 22 is coupled by a drive belt 70 (FIG. 3) to the disc-driving hub 26. Consequently, driving motion of motor 18 rotates both of the disc-driving hubs 26 and 28.

Each of the opposite side plates such as 14b, 16b of the disc-receivers has two different openings therethrough. The first opening provides access to the center of a disc located in the receiver for clamping the disc against the side of drive hubs 26 and 28. The second opening 72 (FIG. 1) is generally rectangular in shape and provides radial access to the disc through elongated openings (not shown) in the side of the envelope which encloses the flexible recording disc.

To provide for convenient opening of the disc-receivers 14 and 16 the frame rotatably mounts a control shaft 74 (FIGS. 2 and 3) which in turn operates a disc-receiver opening assembly 76. The opener assembly, shown in greater detail in FIGS. 6 through 9, includes a cam memmber 78 fixed to control shaft 74 for rotation therewith. When in an unlocked position, as will be hereinafter described, rotation of shaft 74 and cam 78 selectively extends one of a pair of follower members 80, 82 to open one or the other of the disc receivers.

Referring specifically to FIGS. 6 through 9, the door opening assembly 76 for operating the disc-receivers is shown in greater detail. Preferably the assembly 76 is located near the free outer most ends of the disc-receivers 14 and 16. Shaft 74 extends outwardly therefrom for ready access and operation. A knob (not shown) or other convenient handle may be secured to the outer end 84 of control shaft 74. The door opener assembly itself includes a support body 86 secured by screws 88 to a machined pad 90 which also serves as a base for the alignment posts 64. When the disc-receivers 14 and 16 are closed their apertures 68 (FIG. 2) over alignment posts 64 and their inner surface 14b, 16b abut the sidewall surfaces 92 (FIGS. 2 and 3) of machined pad 90 to serve also as a stop mechanism to hold the disc-receivers in position.

As previously described, cam 78 is fixed for rotation with control shaft 74. Control shaft 74 extends through cam 78 and its inner end 94 (FIG. 8 and 9) is rotatably mounted in a suitable opening 96 provided in machined pad 90. The support body or housing 86 has an elongated aperture or passage 98 (FIGS. 6 and 7) extending transversly of the frame, generally parallel to the outwardly extending alignment posts 64. Transverse passage 98 slidably receives follower members 80 and 82 for movement by cam 78. As cam 78 is rotated with rotation of control shaft 74 from the position shown in FIG. 7 to the position of FIG. 6, follower 80 slides outwardly along channel 98 such that its outer end 100 comes into abutment with the inner wall surface 14b of disc-receiver 14. This urges the door to an open position as illustrated in FIGS. 2 and 6 to allow insertion or removal of the disc assembly 60 within the disc-receiver.

The locking means of the invention prevents rotation of cam member 78 and the consequent movement of the disc-receivers to prevent premature removal of a disc therein by affording no access thereto. In one embodiment, such locking means includes a locking rod assembly 102 mounted for sliding movement into and out of locking engagement with cam 78. Locking rod assembly 102 extends forwardly from a rear wall or upright portion 12b of frame 12 (FIGS. 2 and 3) in which it is slidably retained through an opening 104. A center upright portion 12a of frame 12 (FIG. 3) which serves as a support for the previously described worm follower guide rod 36 also slidably receives locking rod 102, through a suitable aperture provided therein. At the extreme forward end 104 of the locking rod, constituting a locking end, the rod is rounded in shape (FIGS. 2 and 4) where it passes into an aperture 106 (FIGS. 4 and 6) generally centrally located in cam 78. Mounting pad 90 also includes a vertical groove defining an upstanding pair of spaced apart legs 108 (FIGS. 2 through 4 and 9) which serve as guide means for the locking end 104 of locking rod 102.

The locking end 104 of the locking rod is normally biased into, or toward, aperture 106 in the cam by a spring 110. When locking end 104 is positioned within the aperture in the cam, rotation of the cam is positively prevented, thus preventing normal opening of the disc-receiver doors.

Figure 1:
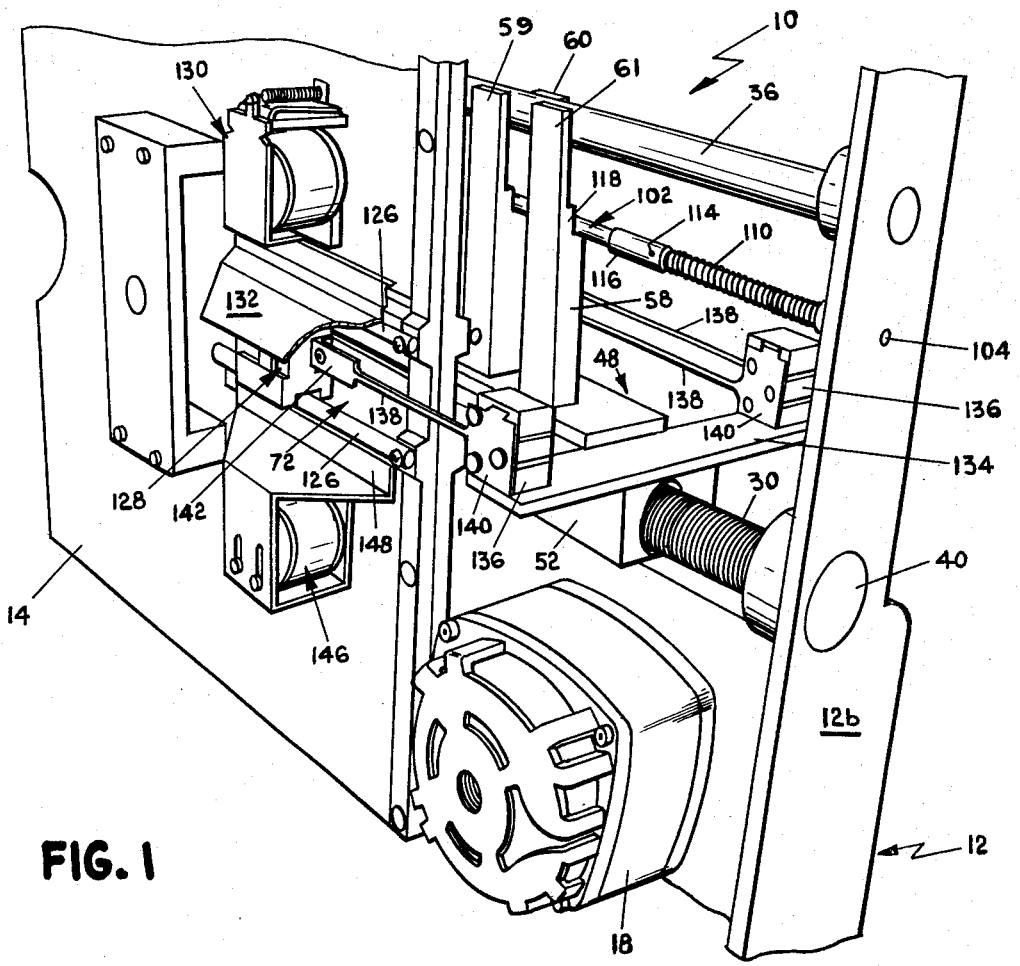
FIG. 1 is a partial perspective view of a data recorder/reproducer apparatus incorporating a first embodiment of disc-receiver interlocking means in accordance with the invention.
Figure 4:
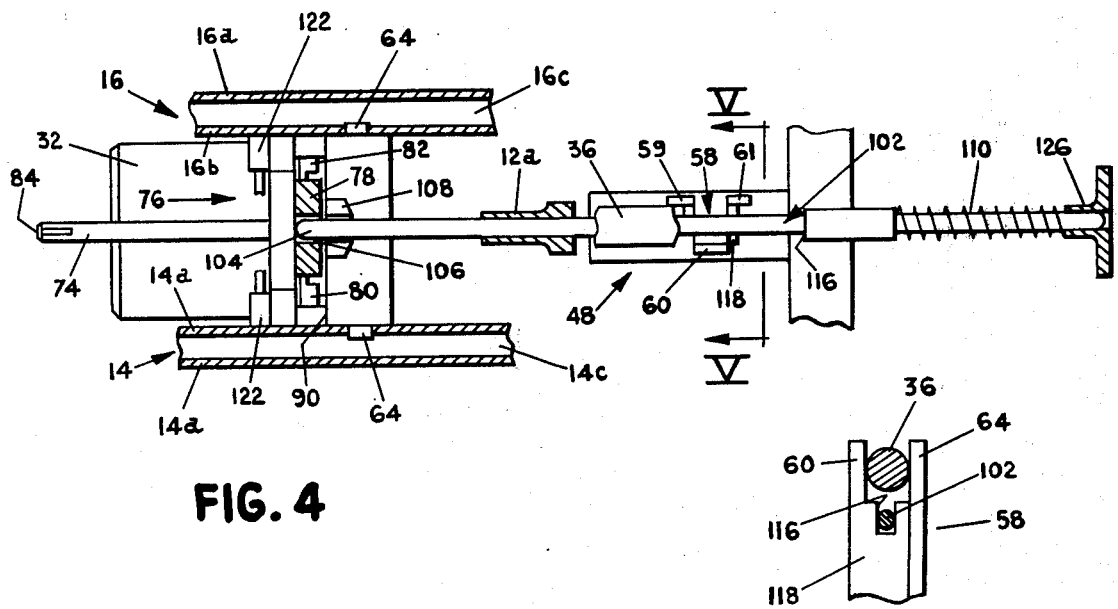
FIG. 4 is a fragmentary cross sectional view taken along the plane IV—IV of FIG. 3.
Figure 5:
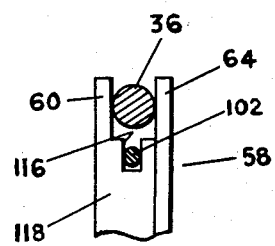
FIG. 5 is a fragmentary cross sectional view taken along the plane V—V of FIG. 4.

Bias spring 110, as shown in FIGS. 1 through 4, is telescoped over locking rod 102 such that one end of the spring abuts the rear upright frame section 12b while the opposite end of the spring abuts a sleeve or collar 112 fixed on locking rod 102 and adjustably retained by a set screw 114 (FIG. 1). As previously mentioned, the locking rod extends generally parallel and below the worm follower guide rod 38. With reference to FIGS. 4 and 5 it will be noted that, like guide rod 38, the locking rod extends through and between the upstanding fingers 59, 60 and 61 of the central guide portion 58 of follower 48, there being slight recess or depression 116 (FIG. 5) provided below the upstanding fingers to receive the guide rod for sliding movement therealong.

During operation, the follower, in response to turning of worm 30 with operation of stepper motor 32, moves either to the left or right as viewed in FIGS. 1 through 4. In the position shown, locking end 104 of the locking rod is in engagement with cam 78 and prevents its rotation. As the worm is rotated in the direction which moves the follower 48 and transducing heads carried thereby to a home or start position, the leading edge 116 of spring sleeve 112 is contacted by the upstanding wall surface or edge 118 on the central guide portion 58 of the follower assembly. As the follower abuts the leading edge 116 of the spring sleeve 112 the locking rod is urged to the right, and will be moved generally into the position shown in FIG. 2 where its outer end 120 extends through upright frame section 12b. As rod end 120 moves into this position, through opening 105, its opposite end 104 is withdrawn from the aperture 106 in cam 78 thereby unlocking the cam and allowing free rotation by turning of shaft 74. Upon such rotation, follower 80 or 82 depending on the direction of rotation is moved to open one or the other of the disc-receivers 14 or 16 thereby allowing access to the disc contained therein. As a disc is removed or inserted and cam 78 is rotated to close the disc-receiver doors, the cam is returned to the position shown in FIG. 7 with aperture 106 in alignment with locking rod 102. Upon subsequent operation of the stepper motor and movement of the follower 48 away from spring sleeve 112, spring 110 pushes against the sleeve again to move the locking rod into locking engagement with cam 78.

Electrical interlocking means such as a position-sensing switch 122 (FIGS. 2, 4 and 9) may be mounted on a pair of upwardly extending ears 124 on the door opening assembly 76 to prevent operation of the stepper motor and other electrical components when the disc-receivers are in an open position. When the doors are closed and the electrical interlocking means 122 is engaged or otherwise senses the closed position of the doors, operation of stepper motor 32 and drive motor 18 may begin. As previously mentioned, operation of the stepper motor to turn worm 30 urging follower 48 to move allows bias spring 110 to shift the locking rod into the aperture in the cam thereby preventing rotation thereof and opening of the disc-receivers 14 and 16.

In addition to the embodiment of the disc-receiver interlock means described above involving the locking rod 102 and its interacting parts, the basic nature of which is purely mechanical, there are also other desirable ways of implementing the concepts of the invention. One such apparatus is illustrated in FIGS. 10 and 11 and constitutes an electromechanical interlock apparatus 176. With this approach, the locking rod 102 is not necessary and is not present. Instead, the cam 78 incorporates a radial slot 178 which, when the cam is in its normal position and is not rotated in either direction to open one or the other of the disc-receivers, is in alignment and registration with a similar slot 180 in the front support 86. In such position of alignment, these two slots will receive a locking blade 182 which constitutes a flat, U-shaped member which is secured orthogonally to the pivotally movable top plate 184 of an electrical solenoid 186 mounted upon an angular plate 188 having one flange portion disposed between support plate 86 and the front portion of the frame 12 defining the surfaces 90 and 92.

As may be observed, when the locking blade 182 of solenoid 186 is in place, engaging the slots in both cam 78 and support 86, the blade acts as a bar which physically prevents the rotation of the cam required to open the disc-receivers. Of course, this condition exists only when solenoid 186 is energized, de-energization resulting in an upward pivoting of blade 182 upon its support plate 184, as a result of the operation of a return spring 190 at the rear of the solenoid, stretched between pivotal plate 184 and stationary plate 188. When this occurs, blade 182 is pivoted upward and out of the aligned slots in the cam and the support, thereby freeing the cam for rotational movement.

Controlling the energization of solenoid 186, in order to effect the aforementioned locking and unlocking action of the disc-receivers, may be accomplished in any of a number of ways. For example, a physically-actuatable switch can be used, mounted for actuation by the follower 48, preferably such that the solenoid is de-energized only when the carrier is in its home position. However, it is to be noted that most recorder/reproducer devices of the general type here involved and used for data-recording applications will utilize recording formats and read/write electronics which identify the particular track on the recording disc at which the recording heads are positioned at any given time. Thus, it is to be expected that the recorder itself will have a readily-available signal input differentiating between the presence of the recording heads at the home track and other tracks, and such signal may readily be used to control actuation of solenoid 186, without the additional requirement of physically-actuated switches or the like. Such an implementation is very advantageously available and, with an electromechanical interlock means of the type just set forth, constitutes a preferred embodiment of the invention.

In order to provide for more complete understanding of the general nature and operation of the instant recorder/reproducer, other basic features are briefly described hereinafter.

The rectangular opening 72 in each of the disc-receivers, mentioned previously, has a pair of spaced, parallel guide rods 126 (FIG. 1) mounted across it. The guide rods cooperatively operate with a carrier member to provide a head position referencing means as further described hereinafter. The rectangular opening 72 in the disc-receivers extends through both side portions 14a, 14b thereof, (FIG. 5), and guide rods 126 have counterparts (not shown) mounted on the inside plate portion 16b (or 14b) of each disc-receiver. The guide rods provide accurate referencing relative to the disc-receivers on which they are mounted.

Each guide rod slidably supports a magnetic head-carrier block 128, upon which a magnetic head is securely supported. Each of the head carriers 128 has a rectangular guideway in its underside which fits over the lower guide 126 and also includes a flat vertical surface which bears flush against the side of the upper guide rod.

As positioned upon the guide rods 126, head carrier 128 is rockable upon the lower guide bar toward and away from (i.e., "angularly" with respect to) the disc-receiver and the disc positioned within the latter; at the same time, the head carrier is slidable along the guide rods, both when tilted toward and away from the recording disc. Such tilting or rocking movement, if utilized, may be controlled or determined by a solenoid 130 mounted above the head carrier and responsive to energization by moving a control arm 132 inwardly and outwardly with respect to the disc-receiver.

Each of the disc-receivers 14, 16 may carry a pair of transducing heads, each mounted on a separate head carrier 128 supported on its own guide rods 126, with separate actuating solenoids for each. thus, each disc may be recorded on either side, to give selectable four-way recording or reproducing operation. Of course, fewer numbers of recording heads may also be used, for example, only one on each disc-receiver.

The head carriers and the transducing heads mounted thereon are subjected to sliding movement upon guide rods 126, thereby imparting translational or traversing movement to the transducing heads radially across the face of the recording discs, i.e., in either lateral direction within an elongated radial slot in the disc envelope. This translational movement is obtained by coupling the head carriers to the translator or follower 48 which is threadably mounted on the lead screw or worm 30 as described above.

Follower 48 has a transverse arm 134 (FIG. 1) having an upstanding leg portion 136 at either end, disposed generally in alignment with each of the disc-receivers. To each opposite side of these upstanding leg portions is secured one end of a stiffly flexible head-positioning link arm 138, which may be formed of stainless steel or the like, such member including an integral mounting plate 140 at one end which, in turn, is attached by screws or the like to the leg ends 136 of transverse arm 134. The opposite ends of the head linking arms 130 are attached to a laterally-extending integral mounting pad 142 fixed to the head carrier 128. The head carrier 128, and thus the recording head itself, is positioned on the guide bars 126 with requisite accuracy relative to the motion translator or follower 48 and, thus to worm 30 itself. The rigidity of the head linking arms allows them to push or pull the attached head carriers across their respective discs. At the same time, the torsional flexibility of the head linking arms allows the head carriers and their respective recording heads to undergo the limited movement required in tilting or rocking the same upon the guide bars 126, into and out of transducing position, while, at the same time, freely tracking across the face of the disc as a result of movement by the translator 48 in response to stepped rotation of the lead screw or worm 30. Further, as may be seen in FIG. 2, upon opening of the disc-receiver doors, the flexibility of the head linking arm 138 allows the latter to bow elastically the requisite extent as indicated.

In order to assure proper transducing proximity of the transducing head with flexible disc 60, a pressure pad may be utilized to hold the disc against the transducing head. As illustrated in FIG. 1, a second solenoid 146 may be mounted below the lower guide bar 126 with an upstanding control arm 148 which carries or controls a pressure pad made of elastomeric foam or the like. An identical pressure pad assembly (not shown) may be located on the opposite side of the disc-receiver to operate cooperatively with transducing head 128 on the first side. Thus, when the head carrier 128 on one side of a recording disc is moved into transducing position, the pressure pad on the opposite side of that disc is moved into position by actuation of its controlling solenoid. When so actuated, the pressure pad moves inside the disc-receiver and against the flexible disc envelope, thereby pushing the disc against the oppositely-disposed recording head.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiment or variations in structure which utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are defined as follows:

1. In a recorder/reproducer apparatus of the type using a magnetic disc as the recording media, having at least one transducing head for recording and reproducing operations on said disc, having receiver means for receiving and positioning said disc in transducing relationship to said head, said receiver means having at least a portion shiftable between a position providing access for placing or removing a disc therefrom and an operative position precluding such access, having means for shifting said receiver means portion between said access and operative positions, and drive means for moving said head radially along the side of said disc for transducing operation therewith, including movement to and from at least one home position in which the head is located along the side of the disc at some point along the width of said disc between its center and its edge, the improvement comprising: interlocking means for disabling said receiver means portion from shifting to said access position when said head is away from said home position, including means for locking and unlocking said shifting means, and means for controlling the locking and unlocking of said shifting means in response to the particular relative position of said head along the side of said disc such that the shifting means is shiftable to an unlocked position only when said head is in said home position.

2. The apparatus of claim 1 wherein said shifting means includes cam and cam follower means operatively engageable to move said disc-receiver means between said positions in response to movement of said cam; said locking means being in locking engagement with said cam or said follower when said head is away from said home position and shiftable into an unlocking position with respect to said cam or follower when said head is in home position, to thereby allow movement of said receiver means portion into said access position with movement of said cam when said head is in said home position.

3. The apparatus of claim 2 wherein said drive means for moving said transducing head includes means movable along a linear axis and a carrier member mounted thereon for movement along such axis; said locking means including a movable first member mounted for movement along a path generally parallel to said axis; biasing means for normally biasing said first member into locking engagement with said cam; and engagement means on said carrier member and said first member, for mutual engagement to shift said first member into unlocked position.

4. The apparatus of claim 3 wherein said movable first member comprises an elongated locking bolt mounted for sliding movement.

5. The apparatus of claim 4 wherein said locking bolt has a portion disposed for contact by said carrier member during its said movements, and is slidably movable by said carrier through such contact and ensuing movement.

6. The apparatus of claim 3 wherein said drive means for moving said transducing head includes means movable along a linear axis and a carrier member mounted thereon for movement along such axis; said locking means including a movable first member mounted for movement along a path generaly parallel to said axis; biasing means for normally biasing said first member out of locking engagement with said cam; and wherein said movable first member comprises an arm mounted for generally arcuate movement.

7. The apparatus of claim 6 wherein said arm is a pivotal member.

8. The apparatus of claim 7 including a solenoid actuator for moving said pivotal arm.

9. In a recorder/reproducer apparatus having receiver means for receiving and holding a magnetic disc in proximity to a transducing head, said receiver means having a disc-receiver access condition and a non-receiving operational condition; and drive means for moving said head radially along the side of said disc for transducing operation therewith, including movement to and from at least one home position in which the head is located along the side of the disc at some point along the width of said disc between its center and its edge, the improvement comprising: means for placing said receiver means in said access and said operational conditions; means for inhibiting said receiver-placing means to selectively inhibit placing said receiver means in said access condition; means for sensing the position of said head along the side of the disc and at least when the head is in said home position therealong; and means interconnecting said sensing means and said inhibiting means to actuate the latter when said head is at a point along the disc other than said home position, thereby inhibiting disc removal at such position.

10. The apparatus of claim 9 and including biasing means normally biasing said inhibiting means into locking engagement with said receiver-placing means; and means carried by said drive means into operable engagement with said inhibiting means to urge same oppositely of said biasing means and out of locking engagement with said placing means.

11. In a recorder/reproducer apparatus having receiver means for receiving and holding a magnetic disc in proximity to a transducing head, said receiver means having at least one movable portion having a first position which affords access into said receiver for disc placement and a second position not affording such access; and drive means for moving said head radially of and along the side surface of the disc in transducing relation therewith; the improvement comprising: means responsive to the particular instantaneous relative position of said transducing head along the side of the disc and between the center and the outer edge thereof for selectively controlling said movable portion as a function of at least one particular such position of said head, to prevent placement of said movable portion in its said first position when said head is not in said particular position.

12. In a recorder/reproducer apparatus having receiver means for receiving and holding a magnetic disc in proximity to a transducing head, said receiver means having at least one movable portion having a first position which allows removal of said disc from said receiver and a second position preventing removal of said disc from said receiver; and drive means for moving said head radially of and along the side surface of the disc in transducing relation therewith; the improvement comprising: means responsive to the particular instantaneous relative position of said transducing head along the side of the disc and between the center and the outer edge thereof for selectively controlling said movable portion as a function of at least one particular such position of said head, to prevent placement of said movable portion in its said first position when said head is not in said particular position.

* * * * *